(12) United States Patent
Wong et al.

(10) Patent No.: US 9,344,941 B2
(45) Date of Patent: May 17, 2016

(54) AUTONOMOUS CELL RESELECTION BY A USER EQUIPMENT

(75) Inventors: Shin Horng Wong, Chippenham (GB); Nicola Puddle, Swindon (GB); Graham Brend, Bath (GB)

(73) Assignee: Alcatel Lucent, Boulogne-Billancourt (FR)

( * ) Notice: Subject to any disclaimer, the term of this patent is extended or adjusted under 35 U.S.C. 154(b) by 132 days.

(21) Appl. No.: 14/237,997

(22) PCT Filed: Jul. 24, 2012

(86) PCT No.: PCT/EP2012/003108
§ 371 (c)(1),
(2), (4) Date: May 22, 2014

(87) PCT Pub. No.: WO2013/020649
PCT Pub. Date: Feb. 14, 2013

(65) Prior Publication Data
US 2014/0248878 A1    Sep. 4, 2014

(30) Foreign Application Priority Data
Aug. 10, 2011   (EP) .................................... 11360036

(51) Int. Cl.
*H04W 36/00*    (2009.01)
*H04W 36/24*    (2009.01)
(Continued)

(52) U.S. Cl.
CPC .......... *H04W 36/24* (2013.01); *H04W 36/0061* (2013.01); *H04W 36/30* (2013.01); *H04W 36/36* (2013.01); *H04W 60/04* (2013.01)

(58) Field of Classification Search
CPC . H04W 36/24; H04W 36/0061; H04W 36/30; H04W 36/36; H04W 60/04
See application file for complete search history.

(56) References Cited

U.S. PATENT DOCUMENTS

| 7,406,314 B2 | 7/2008 | Sharma |
| 7,725,106 B2 | 5/2010 | Tebbit et al. |

(Continued)

FOREIGN PATENT DOCUMENTS

| EP | 1 806 947 A2 | 7/2007 |
| JP | H 09307943 | 11/1997 |

(Continued)

OTHER PUBLICATIONS

"3rd Generation Partnership Project; Technical Specification Group Radio Access Network; User Equipment (UE) procedures in idle mode and procedures for cell reselection in connected mode (Release 10)," 3GPP TS 25.304 V10.0.0, XP050476462, pp. 1-51, (Mar. 2011).

(Continued)

*Primary Examiner* — Mahendra Patel
(74) *Attorney, Agent, or Firm* — Fay Sharpe LLP (57) ABSTRACT

User equipment and method of notifying a wireless communication network of impending autonomous cell reselection from a serving cell to a second cell. The user equipment comprises: monitoring logic, determining logic and notification logic. The monitoring logic is operable to monitor signals received from said serving cell and said second cell; the determining logic is operable to determine whether the signals received from said serving cell and said second cell meet predetermined cell reselection warning criteria, and the notification logic is operable, if said predetermined cell reselection warning criteria are met, to notify said serving cell of said impending autonomous user equipment cell reselection to said second cell. Accordingly, user equipment is operable to send an indication of cell reselection to a network prior to fully triggering a cell reselection procedure, thereby allowing a network to make preparations for an impending cell reselection event, thereby minimizing potential disruption to a network user.

12 Claims, 3 Drawing Sheets

Traditional UMTS Architecture (51) Int. Cl.
*H04W 36/30* (2009.01)
*H04W 36/36* (2009.01)
*H04W 60/04* (2009.01)

(56) References Cited

U.S. PATENT DOCUMENTS

| | | | |
|---|---|---|---|
| 2004/0082328 A1* | 4/2004 | Japenga | H04W 36/30 455/436 |
| 2005/0079870 A1* | 4/2005 | Rick | H04W 60/04 455/437 |
| 2005/0176468 A1* | 8/2005 | Iacono | H05B 7/0689 455/562.1 |
| 2007/0173254 A1 | 7/2007 | Tebbit et al. | |
| 2008/0069088 A1* | 3/2008 | Petrovic et al. | 370/354 |
| 2009/0088160 A1* | 4/2009 | Pani et al. | 455/436 |
| 2009/0168728 A1* | 7/2009 | Pani et al. | 370/332 |
| 2010/0216469 A1* | 8/2010 | Yi | H04W 48/20 455/435.3 |
| 2011/0116470 A1* | 5/2011 | Arora | H04W 36/0016 370/331 |
| 2012/0165005 A1* | 6/2012 | Brend et al. | 455/422.1 |
| 2012/0289223 A1* | 11/2012 | Raouf | H04W 48/16 455/423 |
| 2012/0307795 A1 | 12/2012 | Takahashi et al. | |
| 2014/0206355 A1 | 7/2014 | Pani et al. | |

FOREIGN PATENT DOCUMENTS

| | | |
|---|---|---|
| JP | 2001/103634 | 4/2001 |
| JP | 2004/140545 | 5/2004 |
| JP | 2007/531350 | 11/2007 |
| JP | 2007/535251 | 11/2007 |
| JP | 2009/525005 | 7/2009 |
| JP | 2010/531577 | 9/2010 |
| JP | 2011/509050 | 3/2011 |
| JP | 2011/120110 | 6/2011 |
| JP | 2012/509620 | 4/2012 |
| JP | 2012/523177 | 9/2012 |
| WO | WO 2004/091246 | 10/2004 |
| WO | WO 2009/129752 A1 | 10/2009 |
| WO | WO 2010/017719 A1 | 2/2010 |
| WO | WO 2010/057128 | 5/2010 |
| WO | WO 2010/115058 | 10/2010 |

OTHER PUBLICATIONS

New Postcom, "Cell Restoration Indication for LCR TDD," 3$^{rd}$ Generation Partnership Project (3GPP), 3GPP TSG-RAN WG3 Meeting #67, R3-100691, XP050424511, 3 pages, San Francisco, US, Feb. 22-26, 2010.

"3$^{rd}$ Generation Partnership Project; Technical Specification Group Radio Access Network; Medium Access Control (MAC) protocol specification (Release 10)," 3GPP TS 25.321 V10.1.0, XP050462111, pp. 1-198, (Dec. 2010).

International Search Report for PCT/EP2012/003108 dated Jan. 2, 2013.

* cited by examiner

UE sending a CRI prio to reselecting from macro to a femto network.

AUTONOMOUS CELL RESELECTION BY A USER EQUIPMENT

FIELD OF THE INVENTION

The present invention relates to a method of notifying a wireless communication network of impending user equipment cell reselection, a computer program product and user equipment operable to perform that method.

BACKGROUND

Wireless communication networks are known. In a cellular system, radio coverage is provided to user equipment, for example, mobile telephones, by geographical area. Those geographical areas of radio coverage are known as cells. A base station is located in each geographical area to provide the required radio coverage. A base station may support more than one cell providing coverage in the same geographical area. User equipment in the area served by a base station receives information and data from a base station and transmits information and data to a base station.

Information and data transmitted by the base station to the user equipment occurs on channels of radio carriers known as downlink carriers. Information and data transmitted by a user equipment to the base station occurs on uplink channels of radio carriers known as uplink carriers.

In known wireless telecommunication networks, user equipment can move between geographical base station coverage areas. Services provided to user equipment are typically overseen by a radio network controller (RNC). The RNC communicates with user equipment via base stations and determines which base station each user equipment is primarily connected to. Furthermore, the RNC acts to control and communicate with a base station and user equipment when user equipment moves from a geographical area served by one base station to a geographical area served by another base station, or between geographical areas served by the same base station.

An area served by any particular base station typically comprises several sectors which together define a coverage area for that base station. Typically, a base station serves three sectors. Those sectors may be served by separate antenna arrays provided on the base station. As well as controlling movement between base station coverage areas, the RNC also has visibility of, and communicates with, the base station and user equipment when the user equipment moves between sectors within a geographical coverage area served by a single base station.

Movement between the sectors provided by a single base station and movement between coverage areas served by different base stations are known as "mobility events" and/or "relocation", and are overseen by the RNC. Typically, the extent of the involvement of the RNC in such mobility events or relocations will depend upon the radio state of operation of the user equipment. For example, relocation of user equipment when that user equipment is in a highly active state (ie, actively supporting communication of data between user equipment and a source base station in a cell_DCH state) involves an active control of handover by the RNC from a source base station to a target base station, as identified by measurement reports provided by that user equipment. The user equipment identifies the measured characteristics of signals received from a target base station.

Relocation during a substantially inactive state (such as cell_FACH) of user equipment typically does not require involvement of an RNC to allow the user equipment to relocate to a target base station.

As the configuration, operation and arrangement of network nodes such as base stations and user equipment within a wireless telecommunications network becomes increasingly complex, unexpected situations can occur which reduce the likelihood of a successful and efficient relocation occurring.

Accordingly, it is desired to provide an improved technique for facilitating relocation.

SUMMARY

A first aspect provides user equipment operable to notify a wireless communication network of impending autonomous cell reselection from a serving cell to a second cell, the user equipment comprising: monitoring logic operable to monitor signals received from the serving cell and the second cell; determining logic operable to determine whether the signals received from the serving cell and the second cell meet predetermined cell reselection warning criteria; and notification logic operable, if the predetermined cell reselection warning criteria are met, to notify the serving cell of the impending autonomous user equipment cell reselection to the second cell.

User equipment may operate in various modes in, for example, a UMTS telecommunications network. On initial turning on of user equipment in a cell, it will typically operate in "idle mode". Once it synchronizes and attaches itself to a base station, it gains a radio resource control (RRC) connection and is referred to as being in a connected mode. User equipment in idle mode does not have a radio resource control (RRC) connection. If user equipment is RRC connected it can be in one of five different RRC states: cell_DCH, cell_FACH, enhanced cell_FACH, cell_PCH or URA_PCH states. User equipment typically moves into cell_DCH state when its traffic is high, since in such a state the user equipment is allocated a dedicated channel on which to transmit and receive data from a base station. In UMTS network architecture, user equipment can be in cell_DCH state, where it is expected to have a high volume of traffic. Operation in a cell_DCH state is typically highly demanding of battery power.

User equipment operates, when not in cell_DCH state, using a random access channel (RACH) on the uplink and a base operates to communicate with user equipment using a forward access channel (FACH). RACH and FACH have a very small data carrying ability. In WCDMA or UMTS systems, the capability for user equipment and base stations to operate and communicate data traffic therebetween using a shared or common resource on downlink and uplink when user equipment is in cell_FACH state has been introduced via enhanced cell_FACH. In the uplink, the data traffic transmission occurs using an enhanced dedicated channel (EDCH) and in the downlink, traffic is sent on a high speed downlink shared channel (HS-DSCH). Those channels allow user equipment and base stations to communicate and transmit larger data packets between themselves for a time, without the need for a user equipment to enter a cell_DCH state. Such an arrangement allows user equipment to remain in the cell_FACH state longer without transitioning to a more dedicated state, thus allowing a power consumption saving.

It will be appreciated that some data traffic may be particularly bursty in nature; for example, demand may be high whilst user equipment loads a website page, but then substantially zero whilst a user reads that website. Operation in full cell_DCH state for such bursty traffic, increasingly used by smartphones, can be particularly wasteful of battery and thus the ability to handle bursty traffic without entering a more dedicated radio connected state is beneficial.

When user equipment is operating in a cell_DCH state (ie, when the user equipment has a high data activity and constant synching with the network), the changing of the serving cell is determined by the network and, in particular, the RNC, and executed in the form of a handover, thereby ensuring that no data traffic is lost in the uplink or downlink. Traditionally, if user equipment is in one of several states in which there is low data activity; for example, a cell_FACH, a cell_PCH or URA_PCH state, mobility is supported using a process known as cell reselection. In cell reselection, the user equipment performs measurements of its serving and neighbour cells to evaluate the best cell to attach itself to. If a neighbouring cell signal is deemed better and is being received more strongly than that of a serving cell, user equipment will autonomously reselect this neighbour cell. Cell reselection is performed by the user equipment itself. That is to say, the user equipment decides, based on its measurements, which cell to attach itself to.

In a typical cell reselection procedure, once user equipment has determined a target neighbour cell to which it wishes to reselect and move to, it sends a cell update message to the target cell. If the user equipment is allowed to attach to the target cell, a cell update confirm message is sent back from the target cell to the user equipment. Since the user equipment decides when to perform a cell reselection procedure itself, the network is typically initially unaware of user equipment reselection decisions until a cell update message is passed through the network from the user equipment to the RNC.

The update procedure introduces a significant delay in the knowledge of the network at the RNC. Whilst in the past such a delay may have been acceptable since cell FACH and other similar states did not typically support much data traffic, the increase in data traffic in those states is such that the delay may cause significant disruption to an end user's experience. As has been described above, due to the nature of smartphone traffic, cell FACH and other similar states are more suited for supporting bursty, infrequent traffic and improvements have been made to support a relatively high data rate in such states. It is envisaged that the use of those states, such as cell FACH, would be more significant as the number of smartphones increases. It is thus beneficial to an end user that the delay in completing a cell reselection procedure and providing an RNC and base station with full knowledge of the operation of user equipment is kept to a minimum.

The first aspect recognises that it is possible to reduce delays in cell reselection caused by current operating techniques.

According to the first aspect, user equipment may be operable to send an indication of impending cell reselection to a source cell prior to full triggering of such a reselection procedure if a set of predetermined cell reselection warning criteria are met. The indication of cell reselection or cell reselection indicator (CRI) may contain information relating to the identity of a target cell and may allow the network to execute procedures towards the target cell to perform necessary preparation prior to full cell reselection by user equipment of the target cell.

It will be appreciated that use of a cell reselection indicator may typically not have been used whilst user equipment is in a cell_FACH state, since that state is not typically expected to have high activity of data traffic and any delay which occurred during cell reselection would historically not have been a significant issue. Given the increase of smartphones and smartphone traffic, such delay may no longer be considered acceptable and the cell_FACH state is used to provide overall efficient network use.

The sending of a cell reselection indicator will typically be triggered based on measurements taken by user equipment. According to some embodiments, the trigger for sending such an indication to the source cell may be the same criteria as those used to trigger cell reselection. According to various embodiments it will be appreciated that a different threshold and/or hysteresis may be used for sending a cell reselection indicator in comparison to execution of full cell reselection. For example, if cell reselection is triggered when a neighbour cell signal quality is XdB higher than that of a source cell for a period of $T_{reselect}$ seconds, then a cell reselection indicator may be configured to be sent according to some embodiments when a neighbour cell signal quality is determined to be YdB higher than that of the source cell for a period of $T_{IND}$ seconds. It will be appreciated that X is greater than Y and $T_{reselect}$ is greater than $T_{IND}$, such that a cell reselection indication is triggered to be sent before full cell reselection occurs.

According to some embodiments, a cell reselection indicator may be sent at the same time as cell reselection occurs. That is to say, identical or the same cell reselection criteria may be used to trigger both the sending of a cell reselection indicator and full cell reselection. This can avoid having a separate evaluation mechanism at user equipment operable to trigger the sending of a cell reselection indicator. Although it reduces the total number of evaluations occurring at user equipment, such an implementation may offer less time for the network to prepare for autonomous user equipment cell reselection. Nonetheless, it will be appreciated that by directly informing a source cell of reselection at the same time as requesting connection to a new cell, the user equipment offers an increase in time for the network to make the necessary preparations for effective and efficient cell reselection.

It will be appreciated that use of cell reselection indicator can be used for macro cell to macro cell handover or reselection, macro network to femto cell network cell reselection and femto to femto reselection. Since use of cell_FACH is increasing for relatively high data throughput, allowing a fast set-up of high speed packet access (HSPA) resources when user equipment moves from one cell to another may assist in providing a reliable and good end user experience. For example, a source cell may be operable to inform a target cell of the type of traffic being sent to user equipment (for example, downlink traffic) and thus a target cell can be operable to prepare its own scheduler so that if the user equipment does reselect that target cell it is operable to quickly schedule data to the user equipment of interest. When a user equipment in cell_FACH moves from a macro network to a femto cell, or between femto cells supported by different femto gateways, a target femto cell will typically need to retrieve information regarding user equipment (for example, user equipment context) to successfully complete the cell reselection process. Typically, the process of cell reselection is such that updating and requesting information from an RNC or femto gateway relating to user equipment can introduce a significant delay between user equipment issuing a cell update message to a target cell and the reception of a cell update confirm message in return from that target cell.

Without a cell reselection indicator warning, in a macro to femto network cell reselection, for example, if user equipment determines that it is necessary to reselect a cell and that cell to which reselection is to occur is a femto cell, the user equipment is operable to send a cell update message to the femto cell. The femto cell sends that cell update message to the femto gateway which then contacts a macro network RNC to update the user equipment location and trigger relocation. Only once that process has occurred can a femto cell confirm to the user equipment the cell update. The difference in time between the cell update confirm and the initial request from the user equipment to update the cell can introduce a significant delay in cell reselection.

The sending of a cell reselection indicator by user equipment does not itself guarantee that cell reselection will occur by that particular user equipment. Depending upon the parameters set to trigger the sending of a cell reselection indicator, it is possible that there will be instances where a cell reselection indicator is sent and the user equipment does not later perform the possible cell reselection. This may occur, for example, if user equipment is moving in one direction towards a cell which offers better signal strength and then changes direction and retreats back into the area served by a source base station. In such a scenario, it will be appreciated that preparation in the target network is not used. Such a scenario does not cause direct impact to user equipment, since the preparation is performed within the network and the network can detect that user equipment did not later perform a cell reselection procedure and will be operable to release any prepared contexts.

In one embodiment, the determining logic is operable to determine whether relative strengths of the signals received from the serving cell and the second cell meet said predetermined cell reselection warning criteria. Accordingly, the cell reselection warning criteria are based on criteria analogous to those upon which cell reselection is based, thereby increasing the likelihood that a warning will be generated appropriately and that false warnings may be minimised.

In one embodiment, the determining logic is operable to determine that the relative signal strengths meet the reselection warning criteria for a predetermined time period. Accordingly, the chance of false sending of a cell reselection warning indication may be minimised.

In one embodiment, the determining logic is operable to determine whether relative strengths of the signals received from the serving cell and the second cell meet the predetermined cell selection warning criteria and wherein the predetermined cell reselection warning criteria are selected to be met before corresponding predetermined relative strengths of the signals received from the serving cell and the second cell selected to trigger cell reselection. Accordingly, a cell reselection warning is likely to be generated before full cell reselection occurs, thus allowing a network to take steps to prepare a second and source network node supporting said second and serving cells respectively, to prepare for impending cell reselection.

In one embodiment, the determining logic is operable to determine whether relative strengths of the signals received from the serving cell and the second cell meet the predetermined cell selection warning criteria and wherein the predetermined cell reselection warning criteria are selected to correspond to predetermined relative strengths of the signals received from the serving cell and the second cell selected to trigger cell reselection. Accordingly, the likelihood of false warning messages being sent within a network may be minimised, whilst still allowing the source, or serving cell, to begin making preparations for cell reselection before it would in the case where only the second cell is notified.

In one embodiment, the user equipment is operating in one of: Cell FACH, Cell_PCH or URA_PCH states. Accordingly, notification of imminent cell reselection whilst a user equipment is operating in one of those states can help to ensure data traffic being carried by user equipment operating in those states is disrupted minimally.

In one embodiment, the notification logic is operable to send a warning of impending autonomous user equipment cell reselection to the second cell, the warning comprising an indication of relative strengths of the signals received from the serving cell and the second cell. Accordingly, by providing more information to a serving cell, the serving cell may be operable to make some assessment of the likelihood of actual cell reselection occurring.

In one embodiment, the determining logic is further operable to determine whether the signals received from the serving cell and the second cell no longer meet predetermined cell reselection warning criteria, and if the predetermined cell reselection warning criteria are no longer met, the notification logic being further operable to notify the serving cell that said impending autonomous user equipment cell reselection to the second cell is no longer impending. Accordingly, resources and allocations made may be released if it appears that cell reselection may no longer occur.

A second aspect provides a method of notifying a wireless communication network of impending autonomous user equipment cell reselection from a serving cell to a second cell, comprising: monitoring signals received from the serving cell and the second cell; determining whether the signals received from the serving cell and the second cell meet predetermined cell reselection warning criteria, and if the predetermined cell reselection warning criteria are met, notifying the serving cell of the impending autonomous user equipment cell reselection to the second cell.

In one embodiment the method comprises: determining whether relative strengths of the signals received from the serving cell and the second cell meet the predetermined cell reselection warning criteria.

In one embodiment the method comprises: determining whether relative strengths of the signals received from the serving cell and the second cell meet the predetermined cell reselection warning criteria and wherein the predetermined cell reselection warning criteria are selected to be met before corresponding predetermined relative strengths of the signals received from the serving cell and the second cell selected to trigger cell reselection.

In one embodiment the method comprises: determining whether relative strengths of the signals received from the serving cell and the second cell meet the predetermined cell reselection warning criteria and wherein the predetermined cell reselection warning criteria are selected to correspond to predetermined relative strengths of the signals received from the serving cell and the second cell selected to trigger cell reselection.

In one embodiment, the user equipment is operating in one of: Cell FACH, Cell_PCH or URA_PCH states.

In one embodiment the method comprises: sending a warning of impending autonomous user equipment cell reselection to the second cell, the warning comprising an indication of relative strengths of the signals received from the serving cell and the second cell.

In one embodiment the method comprises: determining whether the signals received from the serving cell and the second cell no longer meet predetermined cell reselection warning criteria, and if the predetermined cell reselection warning criteria are no longer met, notifying the serving cell that the impending autonomous user equipment cell reselection to the second cell is no longer impending.

In one embodiment, the second cell comprises a small cell. That small cell may be a femto cell, pico, or other small cell. Accordingly, operation of small cells typically occurs via a small cell gateway, for example, a femto gateway, and delays in notifying a network of cell reselection implemented autonomously by user equipment may be minimised by utilisation of a method in which a source cell is informed or warned directly so necessary preparations can be commenced.

In one embodiment, the serving cell comprises a small cell served by a different small cell gateway to that which serves the second cell. Accordingly, delays in communication between gateways may be minimised by utilisation of a method in which a source cell is informed or warned directly so necessary preparations can be commenced.

A third aspect provides a method of notifying a second cell in a wireless communication network of impending autonomous user equipment cell reselection from a serving cell, comprising: receiving notification of the impending autonomous user equipment cell reselection to the second cell; and notifying the second cell of said impending autonomous user equipment cell reselection from the serving cell to the second cell. Accordingly, resource can be allocated at the second cell and data traffic may be pre-scheduled at the scheduler of the second cell, thereby minimising any potential disruptions to a user experience associated with autonomous user equipment cell reselection.

A fourth aspect provides a network node operable to notify a second cell in a wireless communication network of impending autonomous user equipment cell reselection from a serving cell, comprising: notification logic operable to receive notification of the impending autonomous user equipment cell reselection to the second cell; and notify the second cell of said impending autonomous user equipment cell reselection from the serving cell to the second cell. That network node may comprise a macro base station, a small cell base station, an RNC or small cell gateway, or any analogously functional network node.

A fifth and sixth aspect provide a computer program product operable, when executed on a computer, to perform the method of any embodiments of the second or third aspects.

BRIEF DESCRIPTION OF THE DRAWINGS

Embodiments of the present invention will now be described further, with reference to the accompanying drawings, in which.

DESCRIPTION OF THE EMBODIMENTS

Figure 1:
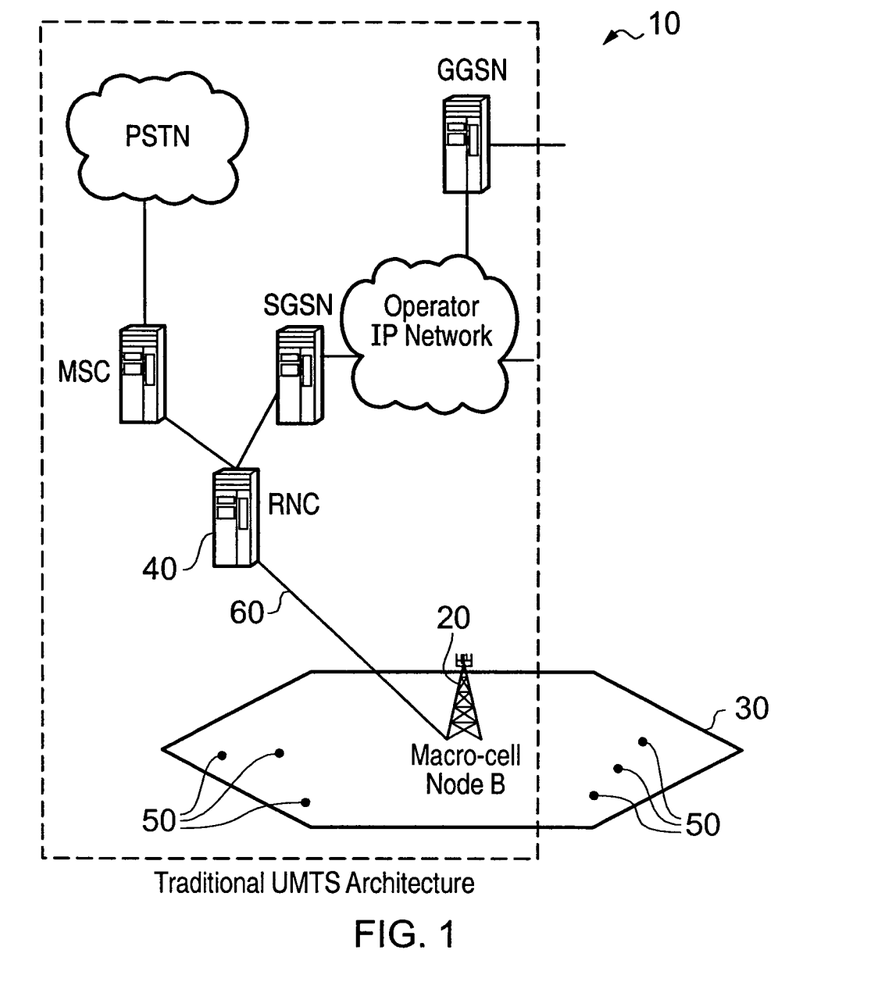
FIG. 1 illustrates the main components of a wireless telecommunications network according to one embodiment.

FIG. 1 illustrates schematically the main components of a wireless telecommunications system, generally 10, according to one embodiment. User equipment 50 roam through the wireless telecommunications system 10. Base stations 20 are provided which support areas of radio coverage 30. A number of such base stations 20 are provided and distributed geographically in order to provide a wide area of coverage to user equipment 50. When user equipment 50 is within an area 30 served by a base station 20, communications may be established between the user equipment 50 and the base station 20 over associated radio links. Each base station 20 typically supports a number of sectors within the geographical area of service 30.

Typically, a different antenna within a base station 20 supports each associated sector. Each base station 20 has multiple antennas. It will be appreciated that FIG. 1 illustrates a small subset of a total number of user equipment 50 and base stations 20 that may be present in a typical wireless communications system 10.

The wireless communications system 10 is managed by a radio network controller (RNC) 40. The radio network controller 40 controls operation of the wireless telecommunications system 10 by communicating with a plurality of base stations 20 over a backhaul communications link 60. The RNC 40 also communicates with user equipment 50 via each base station 20 and thus effectively manages a region of the entire wireless communications system 10.

User equipment 50 communicates with base station 20 by transmitting data and information on channels known as "uplink" or "reverse" channels, and base station 20 communicates with user equipment 50 by transmitting data and information on radio channels known as "downlink" or "forward" channels.

Figure 2:
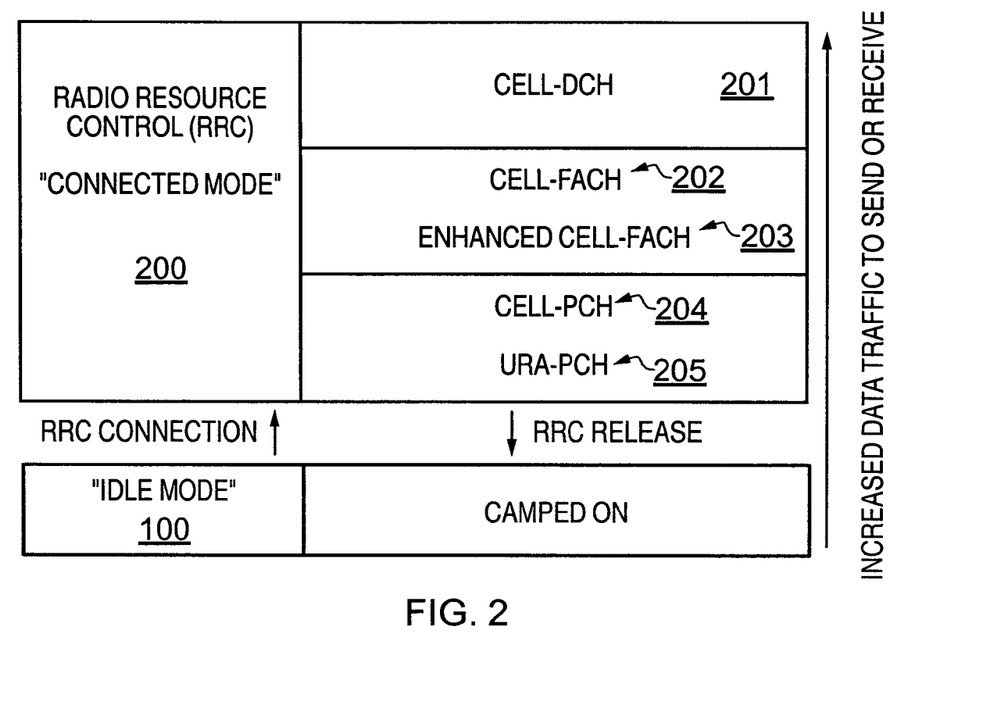
FIG. 2 illustrates a set of radio resource control states of user equipment suitable for use in the wireless telecommunications network of FIG. 1.

By way of background, FIG. 2 illustrates schematically various radio states in which user equipment 50 may operate in a UMTS telecommunications network. On initial turning on of user equipment 50 in a cell 30, it will typically be in "idle mode" 100. Once it synchronises and attaches itself to a base station 20, it gains a radio resource control (RRC) connection and is referred to as being in connected mode 200. User equipment 50 in idle mode does not have a Radio Resource Control (RRC) connection.

If user equipment 50 is RRC connected 200, it can be in one of five different RRC states: Cell_DCH (201), Cell_FACH (202), Enhanced Cell_FACH (203), Cell_PCH (204) and URA_PCH (205) states.

User equipment 50 typically moves into Cell_DCH (201) state when its traffic is high, since in such a state the user equipment 50 is allocated a dedicated channel on which to transmit and receive data from base station 20. In UMTS network architecture, user equipment 50 can be in Cell_DCH state, where it is expected to have high volume of traffic.

The following description describes different techniques for facilitating relocation of user equipment.

Handover

Handover is performed for user equipment when operating in Cell_DCH. The user equipment periodically, or driven by an event, sends measurement reports to the core network. Using these measurement reports, the network will know whether user equipment reception deteriorates to below a handover threshold and whether there are any suitable neighbouring base stations to handover to.

For example, in an arrangement of base stations NB1 to NB4, a user equipment performs handover when operating in the Cell_DCH state. The user equipment is attached to base station NB1. The measurement reports received from the user equipment show that the pilot signal from base station NB4 is higher than that from other base stations, including NB1. NB4 then becomes the target base station supporting a target cell.

The user equipment will typically average the neighbour base station signal strength measurements over time.

Since the network decides which base station the user equipment is to handover to based on the measurements reports received, the core network is then able to inform the relevant base stations of impending handover. When the user equipment hands over to the target base station, this target base station has been fed information by the core network and is able to determine the user equipment downlink traffic.

Cell Reselection

Cell reselection is performed when the user equipment is in the Cell_FACH, Cell_PCH, URA_PCH and idle states.

Reselection in Cell_FACH

In Cell_FACH, the user equipment performs inter-frequency measurements during a predetermined Measurement Occasion. As will be described in more detail below, the Measurement Occasion is defined by a user equipment identifier which is allocatable by the network. The Measurement Occasion is a period of one or more radio frames where the user equipment stops receiving signals from its serving base station on the serving frequency carrier and retunes its receiver to another frequency to measure the pilot signals from a neighbouring base station operating on a different frequency carrier. The Measurement Occasion is periodical and, as mentioned below, is determined by the network.

When user equipment reselects to another cell based on measurements it will transmit a cell update to that target cell (or base station) to indicate that it is now attached to this cell. The network will send a cell update confirm message.

It can be seen that cell reselection is performed by the user equipment; that is to say, the user equipment decides, based on its measurements, which cell it is best to attach to. In contrast, when a cell is in cell_DCH state and has a high data activity and constant signalling with the network, changing the serving cell is determined by the network and executed in the form of a handover. For a cell reselection procedure, once user equipment has determined a target neighbour cell to reselect to, it sends a cell update message to the target cell. If the user equipment is allowed to attach to the target cell the cell update confirm message is sent back to the user equipment. Since it is the user equipment that decides itself when to perform a cell reselection procedure, the network is at least initially unaware of user equipment reselection decisions until it receives a cell update message from the user equipment.

Embodiments described allow user equipment to be operable to send an indication of cell reselection to a source cell prior to full triggering of cell reselection. The indication of cell reselection or cell reselection indicator (CRI) may include various information; for example, a target cell identifier, and thus allows a source network to execute various procedures towards a target cell, thus enabling the network and the source cell to perform necessary preparations before the user equipment takes steps to reselect that target cell.

There has previously been no need for an indication such as a cell reselection indicator, since historically user equipment operating in a cell_FACH state would not be expected to have a high activity of data traffic and thus any delay which occurred during a cell reselection process would typically not cause any disruption to an end user. However, as described above, the cell_FACH state is now increasingly used for more efficient transfer of smartphone traffic and a delay is now likely to cause disturbance to the experience of an end user.

The sending of a cell reselection indicator is triggered in embodiments based on measurements taken by user equipment. In one embodiment, the sending of a cell reselection indicator is triggered based on use of the same cell reselection criteria as those used for cell reselection, but having different predetermined thresholds and/or different hysteresis. In embodiments, if cell reselection is triggered when a neighbour cell signal quality is XdB higher than that of a source cell for a period of $T_{reselect}$ seconds, then a cell reselection indication can be set to be sent when a neighbour cell signal quality is determined to be YdB higher than that of a source cell for a period of $T_{IND}$ seconds where X is greater than Y and $T_{reselect}$ is greater than $T_{IND}$. In such an embodiment it can be seen that the cell reselection indicator will typically be sent prior to cell reselection occurring.

In another embodiment the cell reselection indicator can be sent when cell reselection occurs. That is to say, the same cell reselection criteria having the same values can be used to trigger the sending of a cell reselection indicator. Such an embodiment avoids the need to have a separate evaluation occurring at user equipment to trigger the sending of a cell reselection indicator. It will be appreciated that although this can reduce the number of calculations and evaluations made at user equipment, it may offer less time for a network to prepare a target cell for user equipment cell reselection.

It will be appreciated that use of cell reselection may be particularly useful in a macro network to femto cell network cell reselection procedure. When a user equipment in cell_FACH moves from a macro network to a femto cell, or between femto cells supported by different femto gateways, the target femto cell is typically required to retrieve information regarding the user equipment, for example user equipment context, to complete a cell reselection process. In such an arrangement, the process of updating and requesting information from the RNC or other femto gateway in the case of inter-gateway femto femto cell reselection, introduces a significant delay between a user equipment issuing a cell update message to a target cell and reception of a cell update confirmation back at the user equipment.

Use of a cell reselection can also be used in macro to macro cell reselections. Since cell_FACH is increasingly used for high data throughput, allowing a fast set-up of high speed packet access resources when user equipment moves from one cell to another is important to ensure a good user experience. In such embodiments, a source cell may be operable to inform a target cell of the type of traffic being sent to user equipment and thus a target cell can prepare its scheduler such that when user equipment reselects to it is operable to quickly schedule that data to the user equipment of interest.

Transmission of a cell reselection indicator by user equipment does not guarantee that cell reselection will occur for that user equipment. Dependent upon the parameters set to trigger the transmission of a cell reselection indicator, it is possible that there are scenarios where a cell reselection indicator is sent and the user equipment does not later perform an intended cell reselection. In such a scenario, the preparation within the target network is not used. That unused preparation does not cause any impact to the user equipment since the preparation is performed within the network, and the network is operable to detect that the user equipment did not reselect a cell and can operate to release any prepared contexts.

Figure 3:
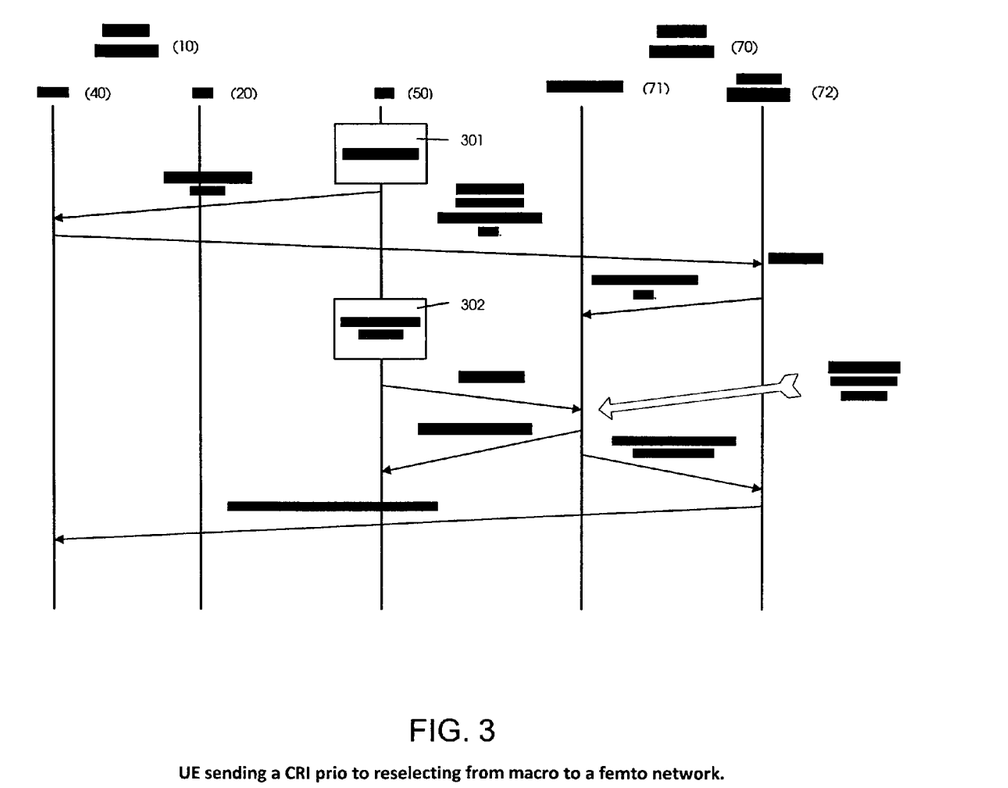
FIG. 3 illustrates schematically use of a cell reselection indicator in accordance with one embodiment.

FIG. 3 illustrates schematically use of a cell reselection indicator in accordance with one embodiment. In the example shown in FIG. 3, user equipment 50 moves from a macro network 10 to a small cell network (in this case, a femto network 70). The signalling diagram of FIG. 3 illustrates one embodiment by which cell reselection may occur. As shown, user equipment 50 constantly evaluates signal qualities received from neighbour cells. At step 301 it determines that it is likely to perform cell reselection to a target femto cell 71. That is to say, user equipment 50 determines that predetermined cell reselection indication criteria have been met. The user equipment then sends a cell reselection indication (CRI) to its current source macro cell supported by base station 20. Upon receiving the CRI passed up from base station 20 to RNC 40, the macro network RNC notifies the target femto cell 71 of the existence of user equipment 50 and supplies, for example, user equipment ID. At the same time, the RNC transmits necessary relocation information to the target femto cell 71. Since the relocation message is passed to the femto cell via a target femto gateway 72, the gateway verifies that the user equipment of interest 50 is allowed within the femto network 70 and the target femto cell 71 is then operable to look for or to wait for possible user equipment cell reselection from user equipment 50. At point 302 user equipment 50 determines that full cell reselection criteria have been met and is operable to reselect femto cell 71 from the femto network and sends a cell update to the target femto base station 71. At this point the femto network has already verified that user equipment 50 is eligible to attach to the network 70 and the network already has all of the necessary relocation information to connect to user equipment 50. The femto network is then operable to send a cell update confirm message to user equipment 50. The femto network then informs the macro network 10 that user equipment 50 has reselected to it and hence the macro network is operable to release any context information it has for the user equipment. It will be appreciated that since the target network has already made all of the preparations for the user equipment prior to full cell reselection being triggered at point 302, the overall procedure from the point of view of user equipment 50 is significantly quicker than previous cell reselection methods. Embodiments reduce the delay in cell reselection and, in particular, in femto cell reselection. Given the increasing importance of cell_FACH for smartphone traffic, such a method mitigates delays from a user's perspective when user equipment moves from one cell to another.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its scope as defined by the claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. User equipment operating in one of Cell FACH, Cell_PCH, or URA_PCH states, operable to notify a wireless communication network of impending autonomous cell reselection from a serving cell to a second cell, said user equipment comprising:

a receiver operable to monitor signals received from said serving cell and said second cell;

a processor configured to measure the signals received from said serving cell and said second cell and determine if the signals meet predetermined cell reselection warning criteria, said processor operable to determine whether relative strengths of said signals received from said serving cell and said second cell meet said predetermined cell reselection warning criteria and wherein said predetermined cell reselection warning criteria are selected to be met before corresponding predetermined relative strengths of said signals received from said serving cell and said second cell selected to trigger cell reselection; and a transmitter, if said predetermined cell reselection warning criteria are met, said predetermined cell reselection warning criteria are selected to correspond to predetermined relative strengths of said signals received from said serving cell and said second cell selected to trigger cell reselection, configured to send a warning to said second cell of impending autonomous user equipment cell reselection to said second cell, said warning comprising an indication of relative strengths of said signals received from said serving cell and said second cell.

2. User equipment according to claim 1, wherein said processor is operable to determine whether relative strengths of said signals received from said serving cell and said second cell meet said predetermined cell reselection warning criteria.

3. User equipment according to claim 1, wherein said processor is operable to determine whether relative strengths of said signals received from said serving cell and said second cell meet said predetermined cell reselection warning criteria and wherein said predetermined cell reselection warning criteria are selected to correspond to predetermined relative strengths of said signals received from said serving cell and said second cell selected to trigger cell reselection.

4. User equipment according to claim 1, wherein said processor is further operable to determine whether the signals received from said serving cell and said second cell no longer meet predetermined cell reselection warning criteria; and if said predetermined cell reselection warning criteria are no longer met, said transmitter being further operable to notify said serving cell that said impending autonomous user equipment cell reselection to said second cell is no longer impending.

5. A method of notifying a wireless communication network of impending autonomous user equipment cell reselection, said user equipment operating in one of Cell FACH, Cell_PCH, or URA_PCH states, from a serving cell to a second cell, comprising:

monitoring signals received from said serving cell and said second cell;

determining whether the signals received from said serving cell and said second cell meet predetermined cell reselection warning criteria and determining whether relative strengths of said signals received from said serving cell and said second cell meet said predetermined cell reselection warning criteria and wherein said predetermined cell reselection warning criteria are selected to be met before corresponding predetermined relative strengths of said signals received from said serving cell and said second cell selected to trigger cell reselection; and if said predetermined cell reselection warning criteria are met, said predetermined cell reselection warning criteria are selected to correspond to predetermined relative strengths of said signals received from said serving cell and said second cell selected to trigger cell reselection, sending a warning to said serving cell of impending autonomous user equipment cell reselection, said warning comprising an indication of relative strengths of said signals received from said serving cell and said second cell.

6. A method according to claim 5, wherein said predetermined cell selection warning criteria comprise predetermined relative strengths of said signals received from said serving cell and said second cell.

7. A method according to claim 5, wherein said predetermined cell reselection warning criteria are selected to be met before corresponding predetermined relative strengths of said signals received from said serving cell and said second cell selected to trigger cell reselection.

8. A method according to claim 5, wherein said second cell comprises a small cell.

9. A method according to claim 5, wherein said serving cell comprises a small cell served by a different small cell gateway to that which serves said second cell.

10. A method of notifying a second cell in a wireless communication network of impending autonomous user equipment cell reselection from a serving cell, said user equipment operating in one of Cell FACH, Cell_PCH, or URA_PCH states, comprising:

receiving notification of said impending autonomous user equipment cell reselection to said second cell; and notifying said second cell in a warning message, of said impending autonomous user equipment cell reselection from said serving cell to said second cell said warning comprising an indication of whether relative strengths of said signals received from said serving cell and said second cell meet predetermined cell reselection warning criteria and wherein said predetermined cell reselection warning criteria are selected to be met before corresponding predetermined relative strengths of said signals received from said serving cell and said second cell selected to trigger cell reselection said warning criteria are selected to correspond to predetermined relative strengths of said signals received from said serving cell and said second cell selected to trigger cell reselection.

11. A network node operating in one of Cell FACH, Cell_PCH, or URA_PCH states, operable to notify a second cell in a wireless communication network of impending autonomous user equipment cell reselection from a serving cell, comprising:

a receiver operable to receive notification of said impending autonomous user equipment cell reselection to said second cell; and a transmitter operable to send a warning to notify said second cell of said impending autonomous user equipment cell reselection from said serving cell to said second cell said warning comprising an indication of whether relative strengths of said signals received from said serving cell and said second cell meet predetermined cell reselection warning criteria and wherein said predetermined cell reselection warning criteria are selected to be met before corresponding predetermined relative strengths of said signals received from said serving cell and said second cell selected to trigger cell reselection and said predetermined cell reselection warning selected to correspond to predetermined relative strengths of said signals received from said serving cell and said second cell selected to trigger cell reselection.

12. A non-transitory computer program product operable, when executed on a computer, to perform the method of claim 5.

* * * * *